(12) United States Patent
Ananthakrishnan et al.

(10) Patent No.: US 9,176,565 B2
(45) Date of Patent: Nov. 3, 2015

(54) CONTROLLING OPERATING FREQUENCY OF A CORE DOMAIN BASED ON OPERATING CONDITION OF A NON-CORE DOMAIN OF A MULTI-DOMAIN PROCESSOR

(71) Applicant: Intel Corporation, Santa Clara, CA (US)

(72) Inventors: Avinash N. Ananthakrishnan, Hillsboro, OR (US); Efraim Rotem, Haifa (IL); Doron Rajwan, Rishon Le-Zion (IL); Jeremy J. Shrall, Portland, OR (US); Eric C. Samson, Folsom, CA (US); Eliezer Weissmann, Haifa (IL); Ryan Wells, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 275 days.

(21) Appl. No.: 13/782,578

(22) Filed: Mar. 1, 2013

(65) Prior Publication Data

US 2013/0179709 A1 Jul. 11, 2013

Related U.S. Application Data

(63) Continuation of application No. 13/282,947, filed on Oct. 27, 2011, now Pat. No. 9,026,815.

(51) Int. Cl.
*G06F 13/14* (2006.01)
*G06F 1/32* (2006.01)

(52) U.S. Cl.
CPC ............ *G06F 1/3234* (2013.01); *G06F 1/3203* (2013.01); *G06F 1/324* (2013.01); *G06F 13/14* (2013.01); *Y02B 60/1217* (2013.01)

(58) Field of Classification Search
CPC ..................................... G06F 1/26; G06F 1/30
USPC .......................... 713/300–340; 710/306–315
See application file for complete search history.

(56) References Cited

U.S. PATENT DOCUMENTS 5,163,153 A 11/1992 Cole et al.
5,287,292 A 2/1994 Kenny et al.
(Continued)

FOREIGN PATENT DOCUMENTS

CN 101351759 1/2009
CN 101403944 4/2009
(Continued)

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.
(Continued)

*Primary Examiner* — Raymond Phan
(74) *Attorney, Agent, or Firm* — Trop, Pruner & Hu, P.C.

(57) ABSTRACT

In one embodiment, the present invention includes a method for determining that a non-core domain of a multi-domain processor is not operating at a frequency requested by the non-core domain, sending a request from the non-core domain to a power controller to reduce a frequency of a core domain of the multi-domain processor, and responsive to the request, reducing the core domain frequency. Other embodiments are described and claimed.

20 Claims, 6 Drawing Sheets

(56) References Cited

U.S. PATENT DOCUMENTS

| | | | |
|---|---|---|---|
| 5,522,087 A | 5/1996 | Hsiang | |
| 5,590,341 A | 12/1996 | Matter | |
| 5,621,250 A | 4/1997 | Kim | |
| 5,931,950 A | 8/1999 | Hsu | |
| 6,748,546 B1 | 6/2004 | Mirov et al. | |
| 6,792,392 B1 | 9/2004 | Knight | |
| 6,823,516 B1 | 11/2004 | Cooper | |
| 6,829,713 B2 | 12/2004 | Cooper et al. | |
| 6,983,389 B1* | 1/2006 | Filippo | 713/324 |
| 6,996,728 B2 | 2/2006 | Singh | |
| 7,010,708 B2 | 3/2006 | Ma | |
| 7,043,649 B2 | 5/2006 | Terrell | |
| 7,093,147 B2 | 8/2006 | Farkas et al. | |
| 7,111,179 B1 | 9/2006 | Girson et al. | |
| 7,146,514 B2 | 12/2006 | Kaushik et al. | |
| 7,194,643 B2 | 3/2007 | Gonzalez et al. | |
| 7,263,457 B2* | 8/2007 | White et al. | 702/132 |
| 7,272,730 B1 | 9/2007 | Acquaviva et al. | |
| 7,412,615 B2 | 8/2008 | Yokota et al. | |
| 7,434,073 B2 | 10/2008 | Magklis | |
| 7,437,270 B2 | 10/2008 | Song et al. | |
| 7,454,632 B2 | 11/2008 | Kardach et al. | |
| 7,529,956 B2 | 5/2009 | Stufflebeam | |
| 7,539,885 B2 | 5/2009 | Ma | |
| 7,574,321 B2 | 8/2009 | Kernahan et al. | |
| 7,596,464 B2 | 9/2009 | Hermerding et al. | |
| 7,603,577 B2 | 10/2009 | Yamaji et al. | |
| 7,624,215 B2 | 11/2009 | Axford et al. | |
| 7,730,340 B2 | 6/2010 | Hu et al. | |
| 7,752,467 B2 | 7/2010 | Tokue | |
| 8,601,288 B2 | 12/2013 | Brinks et al. | |
| 2001/0044909 A1 | 11/2001 | Oh et al. | |
| 2002/0194509 A1 | 12/2002 | Plante et al. | |
| 2003/0061383 A1 | 3/2003 | Zilka | |
| 2004/0030940 A1 | 2/2004 | Espinoza-Ibarra et al. | |
| 2004/0064752 A1 | 4/2004 | Kazachinsky et al. | |
| 2004/0098560 A1 | 5/2004 | Storvik et al. | |
| 2004/0139356 A1 | 7/2004 | Ma | |
| 2004/0268166 A1 | 12/2004 | Farkas et al. | |
| 2005/0022038 A1 | 1/2005 | Kaushik et al. | |
| 2005/0033881 A1 | 2/2005 | Yao | |
| 2005/0046400 A1 | 3/2005 | Rotem | |
| 2005/0132238 A1 | 6/2005 | Nanja | |
| 2005/0223258 A1 | 10/2005 | Watts | |
| 2005/0288886 A1 | 12/2005 | Therien et al. | |
| 2006/0006166 A1 | 1/2006 | Chen et al. | |
| 2006/0041766 A1 | 2/2006 | Adachi | |
| 2006/0050670 A1 | 3/2006 | Hillyard et al. | |
| 2006/0053326 A1* | 3/2006 | Naveh et al. | 713/323 |
| 2006/0059286 A1 | 3/2006 | Bertone et al. | |
| 2006/0069936 A1 | 3/2006 | Lint et al. | |
| 2006/0117202 A1 | 6/2006 | Magklis et al. | |
| 2006/0184287 A1 | 8/2006 | Belady et al. | |
| 2007/0005995 A1 | 1/2007 | Kardach et al. | |
| 2007/0016817 A1 | 1/2007 | Albonesi et al. | |
| 2007/0033425 A1* | 2/2007 | Clark | 713/320 |
| 2007/0079294 A1 | 4/2007 | Knight | |
| 2007/0101174 A1 | 5/2007 | Tsukimori et al. | |
| 2007/0106428 A1 | 5/2007 | Omizo et al. | |
| 2007/0106827 A1 | 5/2007 | Boatright et al. | |
| 2007/0156992 A1 | 7/2007 | Jahagirdar | |
| 2007/0168151 A1 | 7/2007 | Kernahan et al. | |
| 2007/0214342 A1 | 9/2007 | Newburn | |
| 2007/0239398 A1 | 10/2007 | Song et al. | |
| 2007/0245163 A1 | 10/2007 | Lu et al. | |
| 2007/0260895 A1 | 11/2007 | Aguilar et al. | |
| 2008/0028240 A1 | 1/2008 | Arai et al. | |
| 2008/0028778 A1 | 2/2008 | Millet | |
| 2008/0077282 A1 | 3/2008 | Hartman et al. | |
| 2008/0077813 A1 | 3/2008 | Keller et al. | |
| 2008/0104425 A1* | 5/2008 | Gunther et al. | 713/300 |
| 2008/0136397 A1 | 6/2008 | Gunther et al. | |
| 2008/0250260 A1 | 10/2008 | Tomita | |
| 2008/0307240 A1 | 12/2008 | Dahan et al. | |
| 2009/0006871 A1 | 1/2009 | Liu et al. | |
| 2009/0150695 A1 | 6/2009 | Song et al. | |
| 2009/0150696 A1 | 6/2009 | Song et al. | |
| 2009/0158061 A1 | 6/2009 | Schmitz et al. | |
| 2009/0158067 A1 | 6/2009 | Bodas et al. | |
| 2009/0172375 A1 | 7/2009 | Rotem et al. | |
| 2009/0172428 A1 | 7/2009 | Lee | |
| 2009/0235105 A1 | 9/2009 | Branover et al. | |
| 2009/0235108 A1 | 9/2009 | Gold et al. | |
| 2009/0271141 A1 | 10/2009 | Coskun et al. | |
| 2009/0271646 A1* | 10/2009 | Talwar et al. | 713/322 |
| 2010/0058078 A1 | 3/2010 | Branover et al. | |
| 2010/0115309 A1 | 5/2010 | Carvalho et al. | |
| 2010/0146513 A1 | 6/2010 | Song | |
| 2010/0191997 A1 | 7/2010 | Dodeja et al. | |
| 2010/0250856 A1 | 9/2010 | Owen et al. | |
| 2011/0093733 A1 | 4/2011 | Kruglick | |
| 2011/0154090 A1 | 6/2011 | Dixon et al. | |
| 2011/0191607 A1* | 8/2011 | Gunther et al. | 713/300 |
| 2011/0283124 A1 | 11/2011 | Branover et al. | |
| 2012/0053897 A1 | 3/2012 | Naffziger | |
| 2012/0066535 A1 | 3/2012 | Naffziger | |
| 2012/0079290 A1 | 3/2012 | Kumar | |
| 2012/0096288 A1 | 4/2012 | Bates et al. | |
| 2012/0110352 A1 | 5/2012 | Branover et al. | |
| 2012/0114010 A1 | 5/2012 | Branch | |
| 2012/0116599 A1 | 5/2012 | Arndt et al. | |
| 2012/0173907 A1 | 7/2012 | Moses et al. | |
| 2012/0246506 A1 | 9/2012 | Knight | |
| 2013/0080795 A1* | 3/2013 | Sistla et al. | 713/300 |
| 2013/0246825 A1 | 9/2013 | Shannon | |

FOREIGN PATENT DOCUMENTS

| | | |
|---|---|---|
| CN | 101010655 | 5/2010 |
| EP | 1 282 030 A1 | 5/2003 |
| TW | 201040701 | 11/2010 |
| TW | I342498 | 5/2011 |
| TW | 201120628 | 6/2011 |
| TW | I344793 | 7/2011 |

OTHER PUBLICATIONS

SPEC-Power and Performance, Design Overview V1.10, Standard Performance Information Corp., Oct. 21, 2008, 6 pages.

Intel Technology Journal, "Power and Thermal Management in the Intel Core Duo Processor," May 15, 2006, pp. 109-122.

Anoop Iyer, et al., "Power and Performance Evaluation of Globally Asynchronous Locally Synchronous Processors," 2002, pp. 1-11.

Greg Semeraro, et al., "Hiding Synchronization Delays in a GALS Processor Microarchitecture," 2004, pp. 1-13.

Joan-Manuel Parcerisa, et al. "Efficient Interconnects for Clustered Microarchitectures," 2002, pp. 1-10.

Grigorios Magklis, et al., "Profile-Based Dynamic Voltage and Frequency Scalling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling in Real-Time Embedded Systems," 2005, pp. 13-17.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

International Application No. PCT/US2012/028865, filed Mar. 13, 2012, entitled "Providing Efficient Turbo Operation of a Processor," by Intel Corporation.

(56) References Cited

OTHER PUBLICATIONS

International Application No. PCT/US2012/028902, filed Mar. 13, 2012, entitled "Dynamically Controlling Interconnect Frequency in a Processor," by Intel Corporation.

International Application No. PCT/US2012/028876, filed Mar. 13, 2012, entitled "Dynamically Computing an Electrical Design Point (EDP) for a Multicore Processor," by Intel Corporation.

U.S. Appl. No. 13/247,564, filed Sep. 28, 2011, entitled, "Estimating Temperature of a Processor Core in a Low Power State ", by Avinash N. Ananthakrishnan, et al.

U.S. Appl. No. 13/282,896, filed Oct. 27, 2011, entitled, "Enabling a Non-Core Domain to Control Memory Bandwidth ", by Avinash N. Ananthakrishnan, et al.

U.S. Appl. No. 13/282,947, filed Oct. 27, 2011, entitled, "Controlling Operating Frequency of a Core Domain Via a Non-Core Domain of a Multi-Domain Processor ", by Avinash N. Ananthakrishnan, et al.

U.S. Appl. No. 13/285,414, filed Oct. 31, 2011, entitled "Controlling a Turbo Mode Frequency of a Processor," by Avinash N. Ananthakrishnan, et al.

U.S. Appl. No. 13/247,580, filed Sep. 28, 2011, entitled, "Controlling Temperature of Multiple Domains of a Multi-Domain Processor," by Avinash N. Ananthakrishnan, et al.

U.S. Appl. No. 13/285,465, filed Oct. 31, 2011, entitled, "Dynamically Controlling Cache Size to Maximize Energy Efficiency," by Avinash N. Ananthakrishnan, et al.

U.S. Appl. No. 13/225,677, filed Sep. 6, 2011, entitled, "Dynamically Allocating a Power Budget Over Multiple Domains of a Processor," by Avinash N. Ananthakrishnan, et al.

U.S. Appl. No. 13/600,568, filed Aug. 31, 2012, entitled, "Configuring Power Management Functionality in a Processor," by Malini K. Bhandaru, et al.

U.S. Appl. No. 13/285,414, filed Oct. 31, 2011, entitled "Controlling a Turbo Mode Frequency of a Processor," by Avinash N. Ananthakrishnan, et al.

U.S. Appl. No. 13/225,677, filed Sep. 6, 2011, entitled "Dynamically Allocating a Power Budget Over Multiple Domains of a Processor," by Avinash N. Ananthakrishnan, et al.

U.S. Appl. No. 13/247,580, filed Sep. 28, 2011, entitled "Controlling Temperature of Multiple Domains of a Multi-Domain Processor," by Avinash N. Ananthakrishnan, et al.

U.S. Appl. No. 13/285,465, filed Oct. 31, 2011, entitled "Dynamically Controlling Cache Size to Maximize Energy Efficiency," by Avinash N. Ananthakrishnan, et al.

U.S. Appl. No. 13/282,896, filed Oct. 27, 2011, entitled "Enabling a Non-Core Domain to Control Memory Bandwidth," by Avinash N. Ananthakrishnan, et al.

U.S. Patent and Trademark Office, Office Action mailed Jul. 31, 2014, in U.S. Appl. No. 13/247,564.

U.S. Patent and Trademark Office, Office Action mailed Jan. 16, 2014, with Reply filed Apr. 9, 2014, in U.S. Appl. No. 13/247,564.

U.S. Patent and Trademark Office, Office Action mailed Jun. 6, 2014, with Reply filed Sep. 4, 2014, in U.S. Appl. No. 13/282,947.

U.S. Patent and Trademark Office, Office Action mailed May 16, 2014, with Reply filed Aug. 12, 2014, in U.S. Appl. No. 13/285,414.

U.S. Patent and Trademark Office, Final Office Action mailed May 14, 2014, with Request for Continued Examination filed Aug. 13, 2014, in U.S. Appl. No. 13/247,580.

U.S. Patent and Trademark Office, Office Action mailed Aug. 18, 2014, in U.S. Appl. No. 13/285,465.

\* cited by examiner

CONTROLLING OPERATING FREQUENCY OF A CORE DOMAIN BASED ON OPERATING CONDITION OF A NON-CORE DOMAIN OF A MULTI-DOMAIN PROCESSOR

This application is a continuation of U.S. patent application Ser. No. 13/282,947, filed Oct. 27, 2011, the content of which is hereby incorporated by reference.

BACKGROUND

As technology advances in the semiconductor field, devices such as processors incorporate ever-increasing amounts of circuitry. Over time, processor designs have evolved from a collection of independent integrated circuits (ICs), to a single integrated circuit, to multicore processors that include multiple processor cores within a single IC package. As time goes on, ever greater numbers of cores and related circuitry are being incorporated into processors and other semiconductors.

Multicore processors are being extended to include additional functionality by incorporation of other functional units within the processor. These units share a single power budget. As a result, the higher the frequency at which a core portion of the processor operates, the higher the power consumed by the core portion, leaving lesser power for other portions of the processor. Suitable mechanisms to ensure that these different units have sufficient power do not presently exist.

DETAILED DESCRIPTION

In various embodiments, a non-core domain of a multi-domain processor can cause a core domain's frequency to be reduced. This frequency reduction can be by way of control of a maximum allowable frequency at which the core domain can run (commonly referred to as a maximum turbo frequency) as well as control of a guaranteed frequency at which the core domain can run. In this way, a non-core domain (or software, firmware, or logic of such domain) can override a setting or request of an operating system (OS) or other scheduler for higher core frequencies. Thus this non-core domain entity can dynamically alter the range of frequencies at which a core domain is enabled to run, and greater power and/or thermal budget can be allocated to the non-core domain. Although described herein with regard to a multi-domain processor including a core domain having one or more processor cores and a non-core domain that in an illustrative embodiment is a graphics engine, understand the scope of the present invention is not limited in this regard and in other embodiments more than two domains can be present, each of which can have dynamically alterable frequency ranges.

By providing this non-core domain control, a common budget for a processor, e.g., a shared power budget, can be more efficiently used. In general, an OS determines an operating frequency for a core domain based on core utilization only. Other domains however may not benefit from a selected operating frequency for the core domain. For example, a graphics domain may not benefit from a given core operating frequency. For a particular graphics workload, a graphics driver, which can execute within the core domain, can perform a so-called spin loop to check to determine whether a parceled amount of work given to the graphics domain has completed. This spin loop consumes power as it iteratively checks to determine whether the work has completed. By always running, this driver can thus increase core utilization and cause an OS to select a relatively high operating frequency at which to run the core domain. Assuming that this type of scenario causes the core domain to enter into a greater than guaranteed frequency such as a given turbo frequency, due to the common power (and thermal) budget, it is possible that operation of the graphics domain that is actually performing the major workload of the processor in this illustration can be constrained. Instead using embodiments of the present invention, the graphics domain can aid in controlling operating frequency of the core domain. In this way, a power budget can be more efficiently shared between core and non-core domains.

Note that the operating frequency for a core domain selected by the OS can be in accordance with an OS-based power control implementation such as the Advanced Configuration and Platform Interface (ACPI) standard (e.g., Rev. 3.0b, published Oct. 10, 2006). According to ACPI, a processor can operate at various performance states or levels, namely from P0 to PN. In general, the P1 performance state may correspond to the highest guaranteed performance state that can be requested by the OS. In addition to this P1 state, the OS can further request a higher performance state, namely a P0 state. This P0 state may thus be an opportunistic state in which, when power and/or thermal budget is available, processor hardware can configure the processor or at least portions thereof to operate at a higher than guaranteed frequency. In many implementations a processor can include multiple so-called bin frequencies above a guaranteed maximum frequency, also referred to as a P1 frequency. As used herein, a "bin frequency" corresponds to a smallest multiple by which a domain frequency can be updated. In some embodiments this bin frequency can be an integer multiple of a bus clock frequency, although the scope of the present invention is not limited in this regard.

Figure 1:
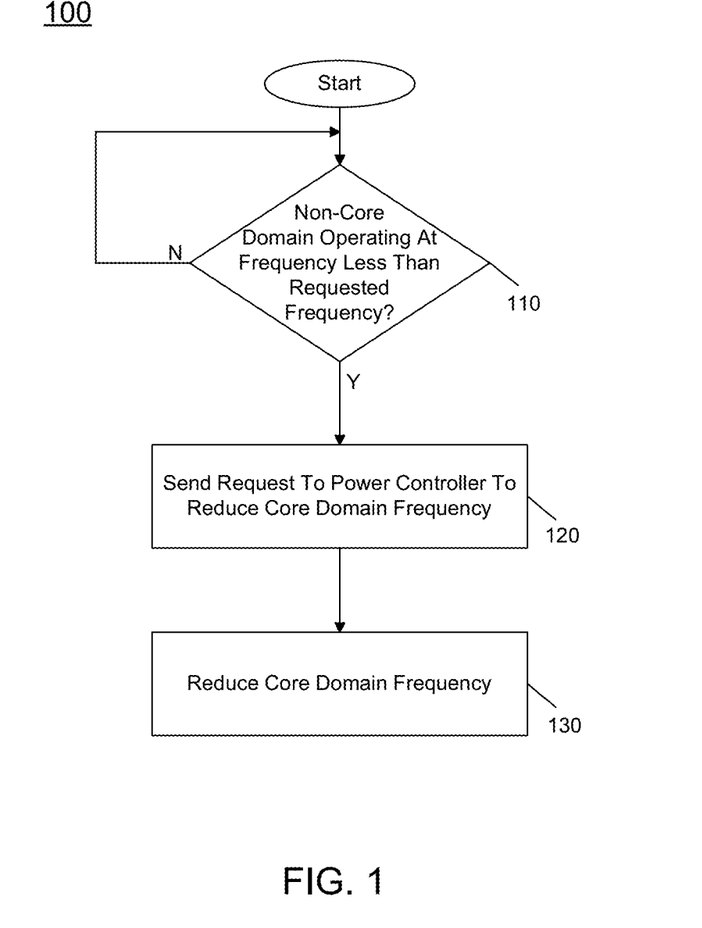
FIG. 1 is a flow diagram of a high level method in accordance with one embodiment of the present invention.

Referring now to FIG. 1, shown is a flow diagram of a high level method in accordance with one embodiment of the present invention. As shown in FIG. 1, method 100 can be used to perform dynamic control of frequency ranges for a core domain in accordance with an embodiment of the present invention. As one example, method 100 can be implemented at least in part by an entity of the non-core domain itself. For example, as discussed above assume a non-core domain includes a graphics engine for which a graphics driver executes on the core domain. As seen, method 100 may begin by determining if a non-core domain is operating at a frequency less than a requested frequency (diamond 110). The driver can make the determination by comparing a frequency requested by the driver with an allocated frequency, which may be allocated by a power controller such as a power control unit (PCU) of the processor.

If the operating frequency of the non-core domain is lower than the requested frequency, control passes to block 120, where a request can be sent to the power controller to reduce a core domain frequency. That is, responsive to this determination, the driver can send a request to cause the core domain to operate at a lower frequency. Thus in contrast to conventional systems, a non-OS, non-core domain entity can make a request to cause an OS-controlled core domain to operate at a lower frequency. Although the embodiment just discussed is with regard to graphics driver control of the operating frequency range, in other implementations other privileged level code, such as ring zero code can perform this request. Note that in some embodiments, there can be limitations on allowing the graphics driver (and more generally a non-core domain) to control operating frequency of the core domain. For example with respect to a graphics engine, the graphics driver may only be allowed to control the core domain frequency for certain workloads, such as a 3D workload or a full-screen mode operation.

As further seen in FIG. 1, responsive to receipt of this request, the core domain frequency can be reduced (block 130). For example, the PCU logic can cause an operating frequency of the core domain to be reduced, e.g., by a predetermined amount, which can correspond to one or more bin frequencies. In a particular implementation as will be discussed further below, the dynamic control of the core domain frequency can be by way of limiting at least one of a maximum turbo frequency and a maximum guaranteed frequency of the core domain. In this way, a dynamically reduced frequency range is available for the core domain. By such dynamic range reduction, greater thermal and/or power budget can be made available for the non-core domain. Although described at this high level in the embodiment of FIG. 1, understand the scope of the present invention is not limited in this regard. For example, the embodiment shown in FIG. 1 is an implementation in which a non-core domain can control operating frequency of the core domain. In many implementations, a vice versa operation, namely core domain control of a non-core domain operating frequency, can also be performed, at least for certain operating modes or workloads.

Different manners of effecting a request for reduced frequency of the core domain are possible. In one particular implementation, a non-core domain can have access to certain configuration registers, e.g., of a PCU, that can enable dynamic control of a frequency range at which a core domain can operate. Such dynamic control can thus act to limit the core domain's frequency lower than its configured frequency levels, e.g., as set by fuses and/or configuration information for the particular processor as set during manufacture. In the context of an ACPI implementation, this lowering of the guaranteed operating frequency can thus violate the P1 guaranteed frequency at which the core domain is guaranteed to run.

Figure 2:
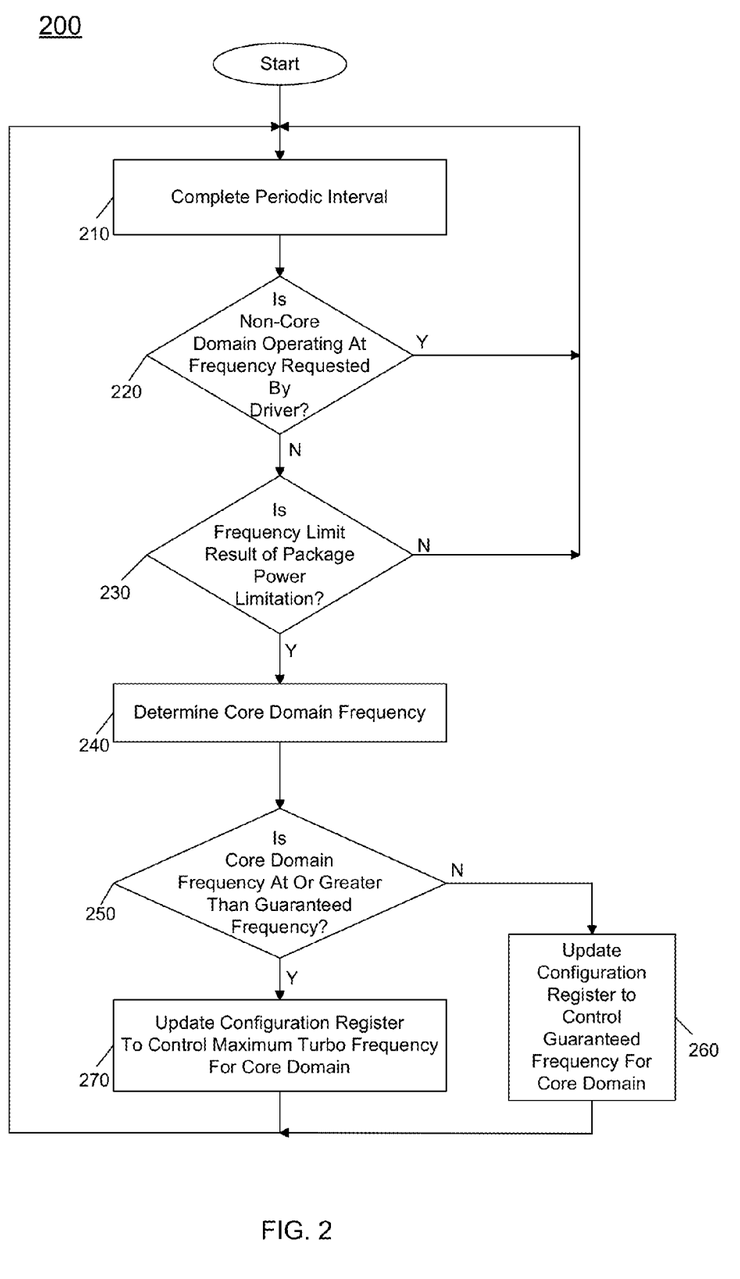
FIG. 2 is a flow diagram of a method for dynamic frequency range control of a core domain in accordance with an embodiment of the present invention.

Referring now to FIG. 2, shown is a flow diagram of a method for dynamic frequency range control of a core domain in accordance with an embodiment of the present invention. As shown in FIG. 2, method 200 may be performed by PCU logic, as well as software, firmware and/or logic of a non-core domain. Assume again for purposes of example that the non-core domain is a graphics engine on which a graphics workload is performed and that this graphics domain is controlled, at least in part, by a graphics driver. As seen, method 200 may iterate through a number of operations at a periodic interval (which is completed and begins a new iteration at block 210). In some embodiments this interval can be on the order of a number of milliseconds (ms), e.g., between approximately 10 and 100 ms. At diamond 220 it can be determined whether the non-core domain is receiving the operating frequency requested by its driver. If so, the iteration is concluded. Otherwise, control passes to diamond 230, where it can be determined whether this frequency limitation on the non-core domain originates from a package power limitation. Although the scope of the present invention is not limited this regard, this determination can be made by PCU logic, e.g., with reference to a power flag, which may be one of many flags of a performance monitor each to indicate whether a given subsystem can operate at a given performance state. For example, a PCU may include a performance monitor for subsystems including electrical, thermal, power, platform, and others. Based on an available performance level for each of these different subsystems, the PCU can determine a package performance state that corresponds to a minimum of these available performance levels. Thus if it is determined at diamond 230 that the frequency limit is due to another reason, dynamic frequency range control of the core domain cannot resolve the issue.

If the frequency limit is due to a package power limitation, control passes to block 240 where the non-core entity can determine the core domain frequency. In one embodiment, this determination can be made by reference to a current operating frequency register of the PCU that stores a current operating frequency. Then at diamond 250, it can be determined whether this core domain frequency is at or greater than a guaranteed frequency level. As discussed above, the guaranteed frequency level may correspond to a P1 frequency. In this way, the driver can determine whether the core domain is operating at least at its guaranteed frequency point of P1. If not, control passes to block 260, where the driver can cause an update to a configuration register to cause the guaranteed frequency for the core domain to be reduced. As one example, a single configuration register may include multiple fields that expose dynamic frequency range control to a driver for a non-core domain. In this example, a first field of such configuration register can be used to cause a reduction in a guaranteed operating frequency of the core domain. As a result of this update, the PCU logic can, e.g., during a next iteration of its power control firmware, cause a reduction in the guaranteed operating frequency for the core domain. Thus if the core domain is currently operating at the guaranteed operating frequency, this frequency reduction can occur in that next iteration. If not, the information in the field can be used by the PCU logic during subsequent requests by the core domain for entry into the guaranteed performance mode.

Referring still to FIG. 2, if instead at diamond 250 it is determined that the core domain frequency is at or greater than the guaranteed frequency, control passes to block 270. There, the driver can cause an update to a configuration register to cause the maximum turbo frequency for the core domain to be reduced. In the above example, another field of the configuration register can be used to cause a reduction in the maximum turbo frequency of the core domain. As a result of this update, the PCU logic can, e.g., during a next iteration of its power control firmware, cause a reduction in the maximum turbo frequency for the core domain. Thus if the core domain is currently operating above the guaranteed operating frequency, this frequency reduction can occur in that next iteration. If not, the information in the field can be used by the PCU logic during subsequent requests by the core domain for entry into a performance mode higher than the guaranteed performance mode. Note that according to method 200, independent control of an upper and lower frequency limit of the core domain can be controlled.

As a result of these operations, the core domain will likely consume less power and accordingly a greater amount of a package power budget can be allocated to the non-core domain. Understand that although shown with only two domains in the embodiment of FIG. 2, additional domains are possible in a given system and in such embodiments, multiple domains can seek to control a dynamic frequency range of a core domain. And furthermore, in the case of multiple core domains such as where each core domain includes one or more cores, these multiple domains can independently request reductions in a frequency range of the other domains. Further, instead of a single multi-field configuration register, in another embodiment separate configuration registers may be present to expose control of maximum turbo frequency and guaranteed frequency to a non-core domain.

Referring now to Table 1, shown is an example of a configuration register, which may be present within a PCU, to enable non-core domain control of a core domain operating frequency.

TABLE 1

| [31:16]  | [15:8]     | [7:0]   |
|----------|------------|---------|
| Reserved | PST_OFFSET | PST_LIM |

Table 1 is thus for a single configuration register example including multiple fields, one of which to enable control of maximum turbo frequency and a second field to enable control of guaranteed frequency. Specifically in the embodiment of Table 1, the PST_OFFSET field provides, e.g., a graphics driver, a means of lowering the fused P1 frequency of the core domain. Assuming a bus clock (BCLK) frequency of 100 megahertz (MHz), an entry of 3 in the PST_OFFSET field corresponds to a request to lower the core domain guaranteed frequency by 3×100=300 MHz. In turn, a second field, namely PST_LIM, provides a means of capping the highest frequency at which the core domain can execute. Again assuming a BCLK frequency of 100 MHz, an entry of 20 in the PST_LIM field corresponds to a request to lower the maximum turbo frequency to 20×100=2000 MHz. Note that this implementation of Table 1 thus provides a ratioed value corresponding to the bus clock frequency. Instead in other embodiments rather than a ratio amount, a fixed value control can be provided, such that the values written to the fields of the configuration register can correspond to the maximum and minimum of the frequency range, respectively.

The configuration register example of Table 1 can be used in connection with the methods described herein such that at run time, if the graphics driver detects a case where the graphics engine is not able to operate at its maximum turbo frequency, it can issue a request to the PCU to update the configuration register or registers accordingly to lower the frequency range at which the core domain is allowed to run. In this way, the driver can dynamically update a frequency range for the core domain such that additional power headroom for the graphics domain can be obtained.

Figure 3:
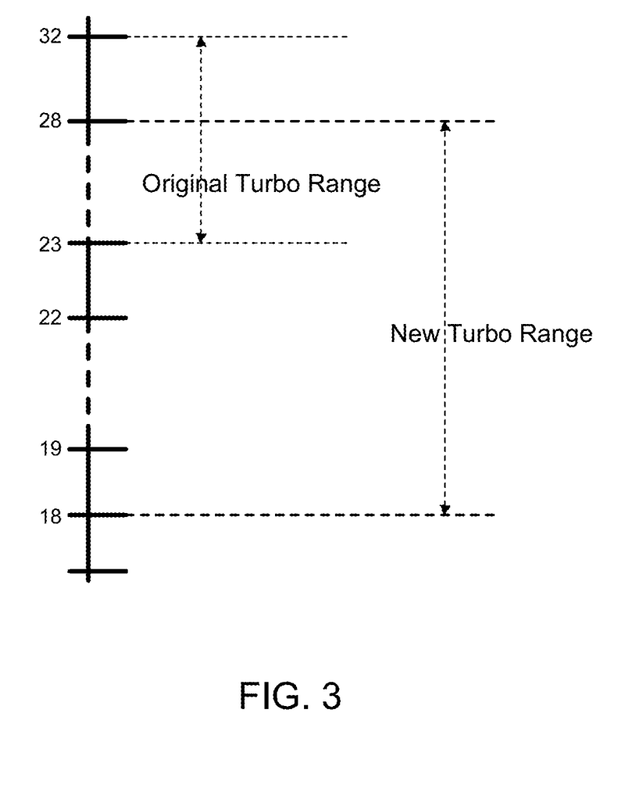
FIG. 3 is a graphical illustration of dynamic frequency range control in accordance with an embodiment of the present invention.

Referring now to FIG. 3, shown is a graphical illustration of dynamic frequency range control in accordance with an embodiment of the present invention. As shown in FIG. 3, for the example processor shown, a fused P1 frequency for the core domain is 2300 MHz, and its fused maximum turbo frequency is 3200 MHz. As an example, the frequency range between the P1 frequency of 2300 MHz and the 3200 MHz maximum frequency can be entered in a P0 performance state. Assume that during run time, the graphics driver determines that the guaranteed frequency of 2300 MHz causes the core domain to consume too much of the processor's power budget thereby leaving an insufficient amount of power headroom for the graphics domain to operate at its maximum turbo frequency. Under this scenario the graphics domain, e.g. via its driver, can use an interface to the PCU to update the configuration register of Table 1 to dynamically alter the allowed frequency range of operation for the core domain. As one example, a graphics driver can program a value of 5 to the PST_OFFSET field and a value of 28 to the PST_LIM field. This translates to dropping the core domain's guaranteed frequency from 2300 MHz to 2300−500=1800 MHz, and dropping the core domain's maximum turbo frequency from 3200 MHz to 2800 MHz. Under a power constrained scenario, the core domain can now legally drop down to 1800 MHz, thereby allowing the graphics domain more power headroom than if the core domain ran at its fused guaranteed frequency of 2300 MHz.

Figure 4:
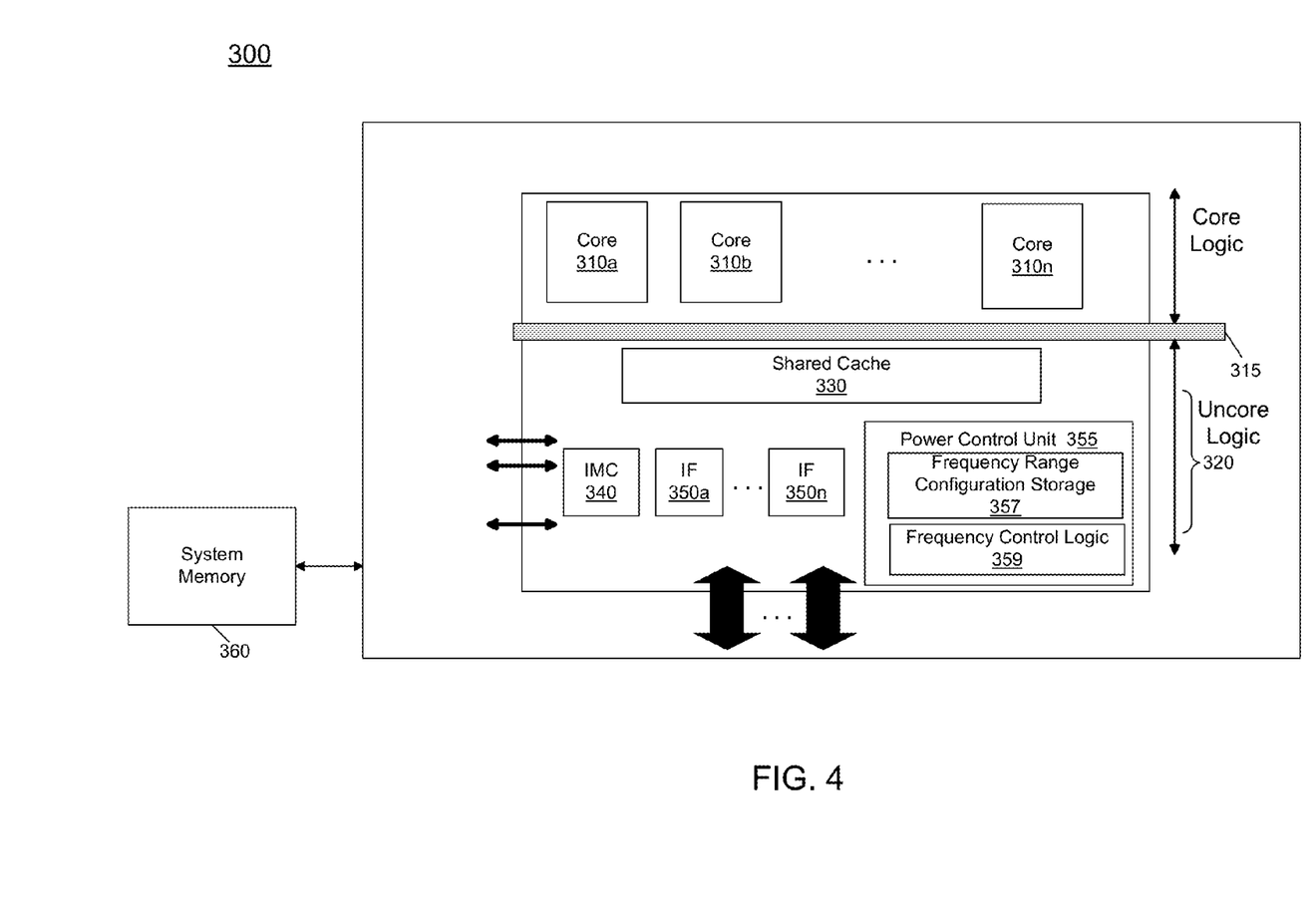
FIG. 4 is a block diagram of a processor in accordance with an embodiment of the present invention.

Referring now to FIG. 4, shown is a block diagram of a processor in accordance with an embodiment of the present invention. As shown in FIG. 4, processor 300 may be a multicore processor including a plurality of cores $310_a$-$310_n$. In one embodiment, each such core may be of an independent power domain and can be configured to operate at an independent voltage and/or frequency, and to enter a turbo frequency mode when available headroom exists. The various cores may be coupled via an interconnect 315 to a system agent or uncore 320 that includes various components. As seen, the uncore 320 may include a shared cache 330 which may be a last level cache. In addition, the uncore may include an integrated memory controller 340, various interfaces 350 and a power control unit 355.

In various embodiments, power control unit 355 may include a frequency control logic 359, which may be a logic to control frequency of different domains of the processor. In the embodiment of FIG. 4, assuming that each core is of an independent power domain, logic 359 can dynamically control a range of frequencies at which each domain can operate. And, as described herein this control can be caused by another of the domains. As further seen in FIG. 4 to enable such cross-domain control of frequency range, different domains can access, e.g., via a register interface, a frequency range configuration storage 357. Although shown at this location in the embodiment of FIG. 4, understand that the scope of the present invention is not limited in this regard and the storage of this information can be in other locations, such as non-volatile storage or the like. Note that in an embodiment, each domain can access one or more configuration registers in this storage each associated with a given domain. As discussed above, these configuration registers can store maximum and guaranteed frequency values for a domain.

With further reference to FIG. 4, processor 300 may communicate with a system memory 360, e.g., via a memory bus. In addition, by interfaces 350, connection can be made to various off-chip components such as peripheral devices, mass storage and so forth. While shown with this particular implementation in the embodiment of FIG. 4, the scope of the present invention is not limited in this regard.

Figure 5:
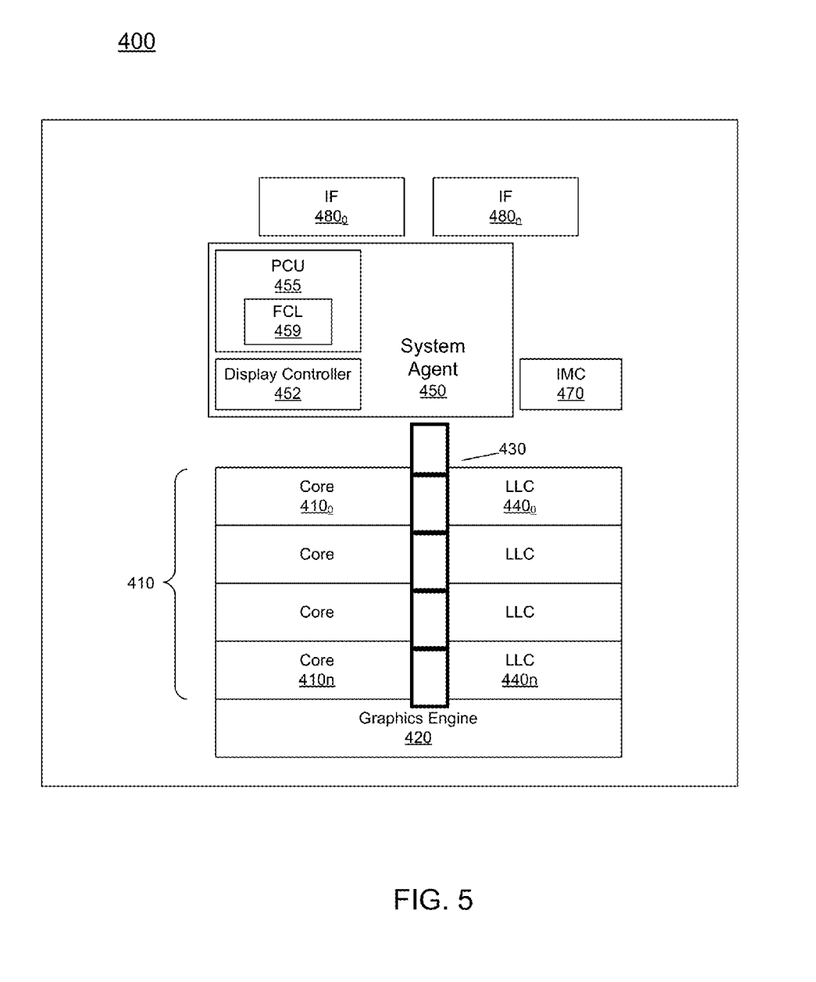
FIG. 5 is a block diagram of a multi-domain processor in accordance with another embodiment of the present invention.

Referring now to FIG. 5, shown is a block diagram of a multi-domain processor in accordance with another embodiment of the present invention of the present invention. As shown in the embodiment of FIG. 5, processor 400 includes multiple domains. Specifically, a core domain 410 can include a plurality of cores $410_0$-$410_n$, a graphics domain 420 can include one or more graphics engines, and a system agent domain 450 may further be present. In various embodiments, system agent domain 450 may execute at a fixed frequency and may remain powered on at all times to handle power control events and power management such that domains 410 and 420 can be controlled to dynamically change frequency, e.g., based on a power budget. Each of domains 410 and 420 may operate at different voltage and/or power. Note that while only shown with three domains, understand the scope of the present invention is not limited in this regard and additional domains can be present in other embodiments. For example, multiple core domains may be present each including at least one core.

In general, each core 410 may further include low level caches in addition to various execution units and additional processing elements. In turn, the various cores may be coupled to each other and to a shared cache memory formed of a plurality of units of a last level cache (LLC) $440_0$-$440_n$. In various embodiments, LLC 440 may be shared amongst the cores and the graphics engine, as well as various media processing circuitry. As seen, a ring interconnect 430 thus couples the cores together, and provides interconnection between the cores, graphics domain 420 and system agent circuitry 450.

In the embodiment of FIG. 5, system agent domain 450 may include display controller 452 which may provide control of and an interface to an associated display. As further seen, system agent domain 450 may include a power control unit 455 which can include a frequency control logic 459 in accordance with an embodiment of the present invention. In various embodiments, this logic may execute algorithms such as shown in FIGS. 1-2 to thus dynamically control a frequency range of one domain responsive to a request from the other domain.

As further seen in FIG. 5, processor 400 can further include an integrated memory controller (IMC) 470 that can provide for an interface to a system memory, such as a dynamic random access memory (DRAM). Multiple interfaces $480_0$-$480_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with a Intel® Quick Path Interconnect (QPI) protocol may also be provided. Although shown at this high level in the embodiment of FIG. 5, understand the scope of the present invention is not limited in this regard.

Figure 6:
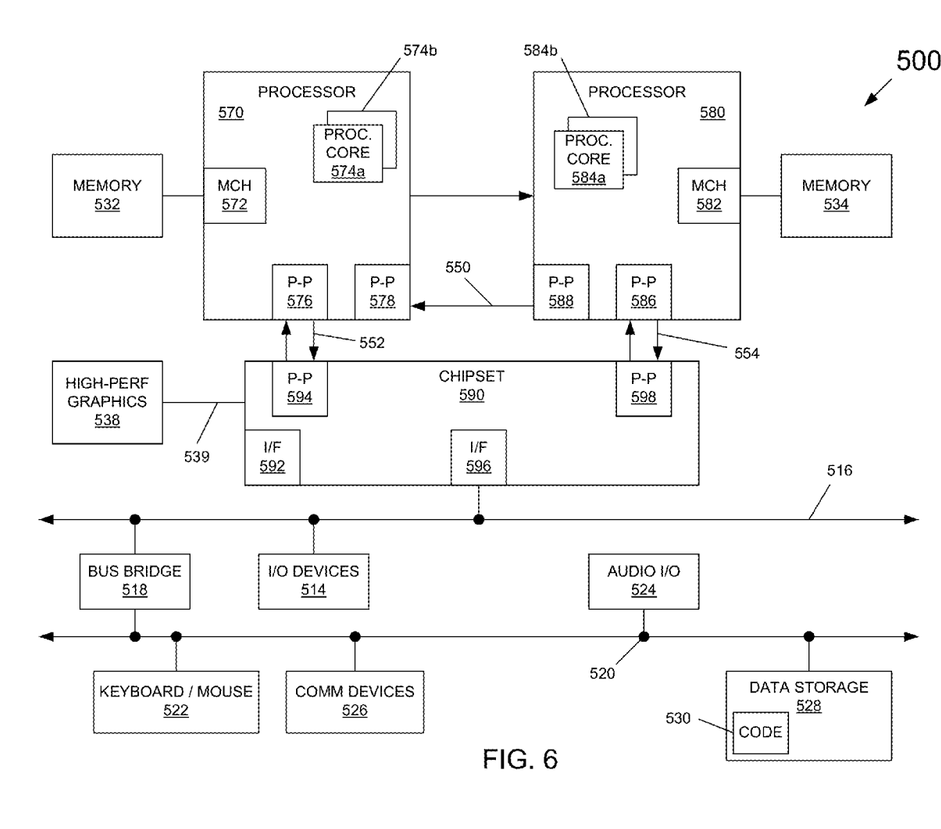
FIG. 6 is a block diagram of a system in accordance with an embodiment of the present invention.

Embodiments may be implemented in many different system types. Referring now to FIG. 6, shown is a block diagram of a system in accordance with an embodiment of the present invention. As shown in FIG. 6, multiprocessor system 500 is a point-to-point interconnect system, and includes a first processor 570 and a second processor 580 coupled via a point-to-point interconnect 550. As shown in FIG. 6, each of processors 570 and 580 may be multicore processors, including first and second processor cores (i.e., processor cores 574a and 574b and processor cores 584a and 584b), although potentially many more cores may be present in the processors. Each of the processors can include a PCU or other logic to perform dynamic frequency range control of a domain of the processor responsive to a request of another domain, as described herein.

Still referring to FIG. 6, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 6, MCH's 572 and 582 couple the processors to respective memories, namely a memory 532 and a memory 534, which may be portions of system memory (e.g., DRAM) locally attached to the respective processors. First processor 570 and second processor 580 may be coupled to a chipset 590 via P-P interconnects 552 and 554, respectively. As shown in FIG. 6, chipset 590 includes P-P interfaces 594 and 598.

Furthermore, chipset 590 includes an interface 592 to couple chipset 590 with a high performance graphics engine 538, by a P-P interconnect 539. In turn, chipset 590 may be coupled to a first bus 516 via an interface 596. As shown in FIG. 6, various input/output (I/O) devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520. Embodiments can be incorporated into other types of systems including mobile devices such as a smartphone, tablet computer, netbook, or so forth.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A machine-readable medium having stored thereon instructions, which if performed by a machine cause the machine to perform a method comprising:
   determining that a first domain of a multi-domain processor is not operating at a frequency requested by the first domain, the first domain comprising one or more graphics engines;
   responsive to the determination, sending a request from the first domain to a power controller of the multi-domain processor to reduce a frequency of a second domain of the multi-domain processor, the second domain comprising one or more cores; and
   responsive to the request, reducing the frequency of the second domain.

2. The machine-readable medium of claim 1, wherein the method further comprises updating a first field of a configuration register to cause the power controller to reduce a maximum turbo frequency of the second domain.

3. The machine-readable medium of claim 1, wherein reducing the second domain frequency includes causing a maximum turbo frequency of the second domain to be lowered from a fused value to a second turbo value less than the fused value.

4. The machine-readable medium of claim 2, wherein the method further comprises updating a second field of the configuration register to cause the power controller to reduce a guaranteed frequency of the second domain.

5. The machine-readable medium of claim 3, wherein the method further comprises determining whether the second domain is operating at least at a guaranteed frequency.

6. The machine-readable medium of claim 5, wherein the method further comprises causing the guaranteed frequency of the second domain to be lowered from a second fused value to a second guaranteed value less than the second fused value.

7. A processor comprising:
   a core domain;
   a graphics domain; and
   a power controller coupled to the core domain and the graphics domain, wherein the core domain is to operate at a frequency range between a maximum frequency and a guaranteed frequency, the maximum frequency and the guaranteed frequency set at manufacture, wherein the graphics domain is to cause the power controller to dynamically reduce at least one of the maximum frequency and the guaranteed frequency of the core domain.

8. The processor of claim 7, wherein the graphics domain is to update a first field of a configuration register if the graphics domain is operating at a frequency less than a requested frequency.

9. The processor of claim 7, wherein a driver of the graphics domain is to cause the power controller to dynamically reduce the at least one frequency, wherein the driver is to execute on the core domain.

10. The processor of claim 8, wherein the power controller is to limit the maximum frequency based on the updated first field of the configuration register.

11. The processor of claim 8, wherein the graphics domain is to thereafter update a second field of the configuration register.

12. The processor of claim 11, wherein the power controller is to limit the guaranteed frequency based on the updated second field of the configuration register.

13. The processor of claim 8, wherein the configuration register is located in the power controller, and is accessible to the graphics domain.

14. The processor of claim 8, wherein a driver of the graphics domain is to access the configuration register, wherein the driver is to execute on the core domain.

15. A system comprising:
   a multi-domain processor including a core domain, a graphics domain, and a power controller, the core domain to operate at a frequency range between a maximum frequency and a guaranteed frequency, the maximum frequency and the guaranteed frequency set at manufacture, wherein the power controller includes a configuration register accessible to the graphics domain, the configuration register to store at least one value to be written by a driver of the graphics domain to enable a dynamic reduction in a frequency range at which the core domain can operate; and
   a dynamic random access memory (DRAM) coupled to the multi-domain processor.

16. The system of claim 15, wherein the driver of the graphics domain is allowed to write to the configuration register when a first graphics domain workload is executing, and is prevented from writing to the configuration register when a second graphics domain workload is executing.

17. The system of claim 15, wherein the power controller includes a second configuration register accessible to the core domain, the second configuration register to store at least one value to be written by the core domain to enable a dynamic reduction in a frequency range at which the graphics domain can operate.

18. The system of claim 15, wherein the graphics domain is to operate at a higher frequency after the dynamic reduction in the core domain frequency range.

19. The system of claim 15, wherein the power controller is to first reduce the maximum frequency of the core domain, and to thereafter reduce the guaranteed frequency of the core domain only if the graphics domain is not operating at a requested frequency after the maximum frequency reduction.

20. The system of claim 15, wherein responsive to update to the configuration register, the power controller is to cause the core domain to operate at a frequency less than the guaranteed frequency set at manufacture, wherein the frequency less than the guaranteed frequency violates an operating system guaranteed frequency.

* * * * *